Dec. 20, 1955  F. W. LEFFER  2,727,810
APPARATUS FOR THE CONVERSION OF FLUID REACTANT STREAMS
IN THE PRESENCE OF SUBDIVIDED PARTICLES MAINTAINED
IN DISPERSED SUSPENSION
Filed May 29, 1950
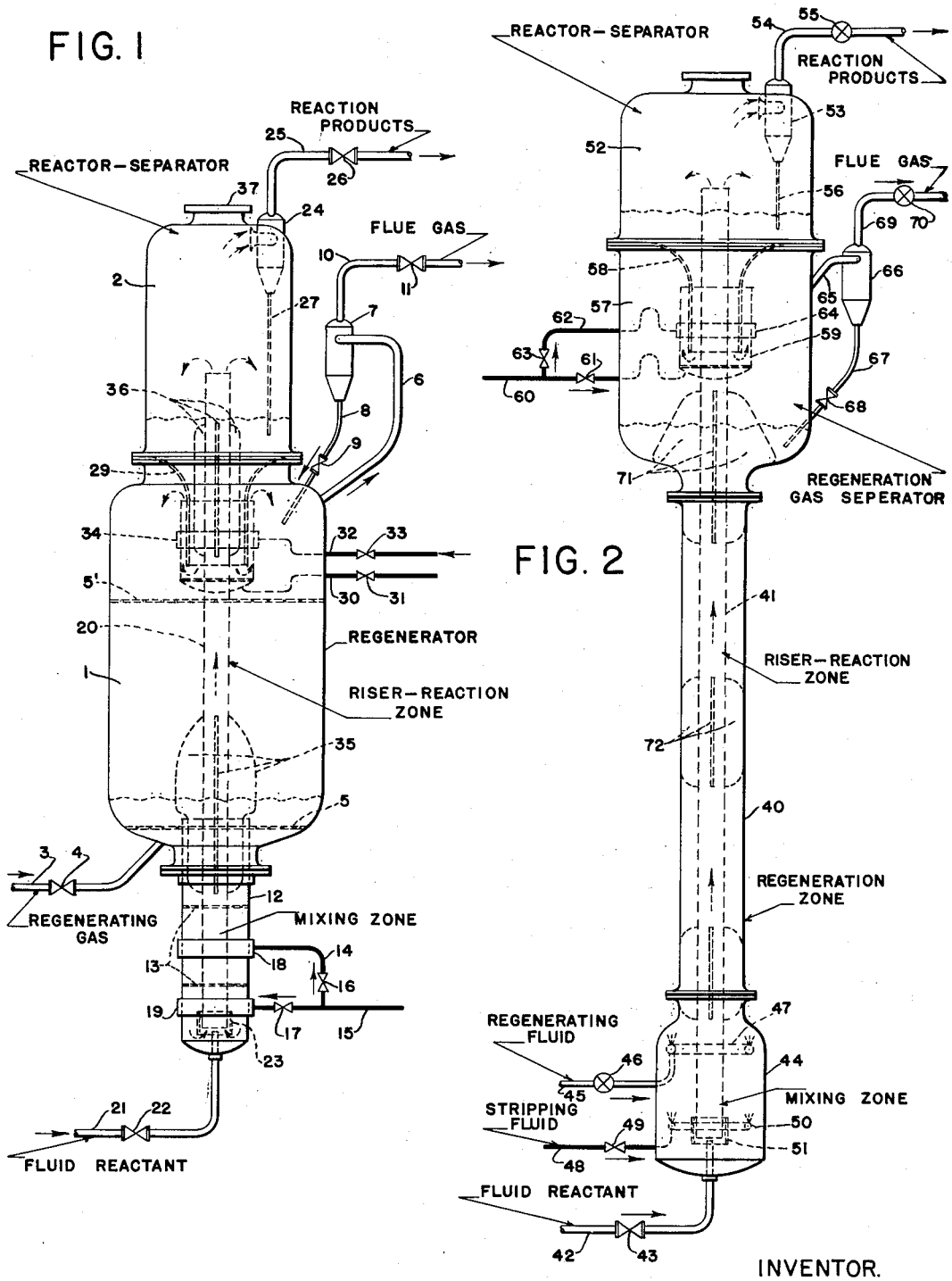
INVENTOR.
FREDERICK W. LEFFER
BY: Chester J. Giuliani
Philip T. Liggett
ATTORNEYS.

United States Patent Office 2,727,810
Patented Dec. 20, 1955

2,727,810

APPARATUS FOR THE CONVERSION OF FLUID REACTANT STREAMS IN THE PRESENCE OF SUBDIVIDED PARTICLES MAINTAINED IN DISPERSED SUSPENSION

Frederick W. Leffer, Riverside, Ill., assignor to Universal Oil Products Company, Chicago, Ill., a corporation of Delaware Application May 29, 1950, Serial No. 164,976

5 Claims. (Cl. 23—288)

This invention relates to an improved process and apparatus for effecting the conversion of fluid reactant streams in the presence of subdivided solid material, and more particularly to effecting the conversion of at least one fluid reactant stream in contact with the particles of solid material therein as a dispersed suspension.

The term "dispersed suspension" as herein used connotes a mass of solid particles suspended in a current of fluid rising past the particles with continuous solids entrainment so that the fluid and solid particles travel upwardly through a confining zone as a continuous stream, that is a stream within which there is no boundary zone across which a marked change in concentration of particles occurs. The term "fluidized bed" as used herein means a mass of solid particles which exhibits the liquid-like characteristics of mobility, hydrostatic pressure, and an observable upper free surface or boundary zone across which a marked change in concentration of particles occurs. The term "moving bed" as used herein refers to a body of solid particles in which the particles remain in contact with each other while they move all in the same direction and at practically the same rate with respect to the walls of the confining zone.

The invention is concerned with those continuous contact operations wherein at least two fluid reactant streams are simultaneously contacted in two separate confined contacting zones with solid particles circulating continuously through these zones and interconnecting passageways and with the discharge of the fluid reaction products as separate streams from the two contacting zones. It is applicable to contact operations involving the simultaneous performance of an endothermic reaction in one of the contacting zones and an exothermic reaction in the other, and to contact operations wherein the solid particles act as a catalyst for at least one of the two principal reactions, or both as a catalyst and heat transfer agent, or as a substantially inert heat transfer agent, or partially as a reactant and simultaneously as a heat transfer agent.

Numerous proposals have already been made for performing continuous contact operations of the types referred to above wherein the solid material is carried as a dispersed suspension in a fluid reactant through one or both of the principal contacting zones, or is maintained as a fluidized bed or moving bed in one or both of these zones. Some of these proposals have gained considerable importance and extensive use in industrial practice, notably those known as "moving bed" and "fluidized bed" systems for the catalytic or pyrolytic conversion of hydrocarbons. These proposals and industrial units require a large inventory of solid material in the system for a given throughput by requiring the presence of large masses of the solid material in either or both of the contacting zones and/or in the interconnecting passageways. Moreover, extensive or complicated interconnecting conduits, constituting a constant source of heat losses, operating difficulties and expensive repairs, have been required for accomplishing the separate recovery of the two main streams of fluid reaction products and the continuous circulation of solid material particularly in those systems which involve the transfer of the solid material as a dispersed suspension in fluid reactant through one or both of the principal reaction zones.

Relative to the known continuous processes for converting fluid reactant streams in the presence of subdivided solid material in principally two separate conversion zones with circulation of solid material through these zones and interconnecting passageways and with separate recovery of the fluid reaction product streams from these conversion zones, it is an important object of the present invention to provide an improvement in this type of process by substantially reducing the required inventory of solid particles circulating in the system. Another object is a material simplification of the total path traversed by the circulating solid in one complete cycle. Another object is an increased thermal efficiency of the process accompanied by reduced requirements for preventing loss of heat from the system. Another object is to provide an apparatus peculiarly adapted for performing the improved process of this invention. These and other objects of the present invention will become more fully apparent from the following description.

The present invention provides for performing the conversion of one of the principal fluid reactant streams in contact with subdivided solid material as a dispersed suspension during its upward flow through a vertical confined straight line reaction path and simultaneously performing the conversion of the other principal fluid reactant stream in contact with solid particles descending in a confined contacting zone enveloping an intermediate portion of the vertical reaction path and maintained in heat exchange relationship with the latter portion. The remainder of the vertical reaction path is substantially completely enveloped by auxiliary passageways for completing the cyclic flow of subdivided solid material in the system in such manner that the solid particles are caused to pass only once in a generally upward direction and only once in a generally downward direction to complete one complete cycle of flow through the system.

The auxiliary passageways provided in accordance with this invention around the end portions of the confined vertical reaction path comprise a separating zone which encloses and surrounds the upper end portion of the confined vertical reaction path at an elevation above that of the aforesaid contacting zone, and a mixing zone at the lower end portion of the confined vertical reaction path and in direct open communication with the lower extremity of the latter. A feeding zone confining a downwardly moving column of solid particles establishes the communicating passageway for the generally downward transfer of solid particles from the lower portion of the aforesaid contacting zone to the mixing zone. The lower portion of the separating zone is utilized for gathering separated solid particles and maintaining them in an accumulation having an upper level below the upper extremity of the vertical reaction path. Fluid reactants and fluid reaction products are excluded from this accumulation by passing a substantially inert sealing fluid therethrough, and solid particles are continuously discharged downwardly from this accumulation into the upper portion of the contacting zone.

The fluid reactant stream to be converted in the vertical straight line reaction path is supplied to the mixing zone and therein is directed upwardly into contact with the solid particles passing from the downwardly moving column into the mixing zone so that these solid particles are aspirated by the fluid reactant stream and form therewith a dispersed suspension which passes directly from the mixing zone upwardly into and through the vertical reaction path. The resultant dispersed suspension is separated in the upper portion of the separating zone into solid particles which settle to join the aforementioned accumulation, and into fluid reaction products which are continuously withdrawn from the separating zone at a point above the upper level of said accumulation therein while separately therefrom the fluid products resulting from the conversion in the aforesaid contacting zone are continuously withdrawn from the latter.

Thus, the single upward path traversed by the solid particles in the present process is essentially defined by the vertical straight line reaction path so that the particles throughout their upward travel are maintained in a dispersed suspension and in contact with a fluid reactant stream undergoing conversion. In the remaining portion of their cyclic travel through the system according to this invention, the particles upon their separation from the fluid reaction products in the upper portion of the separating zone pass first downwardly and substantially out of contact with fluid reactants and fluid reaction products through the accumulation in the lower portion of the separating zone, then downwardly in contact with a second fluid reactant stream through the contacting zone surrounding the intermediate portion of the vertical straight line reaction path, and finally downwardly and substantially out of contact with fluid reactants and fluid reaction products as a downwardly moving column through the feeding zone into the mixing zone. The single upflow path is so coordinated with the single downflow path that the fluid reactants are precluded from commingling and the fluid reaction products are separately recovered from the solids upflow path and the solids downflow path, respectively.

In a particular embodiment of this invention a stream of a hydrocarbonaceous fluid reactant is subjected in vaporous phase to endothermic conversion during its upflow in the straight line reaction path in contact with particles of a catalyst maintained in dispersed suspension in the reactant and promoting its conversion, the vaporous reaction products are separated from the catalyst particles in the separating zone in a manner precluding substantial further conversion of reactant in the separating zone, a stream of separated catalyst is passed from the separating zone downwardly into and through a contacting zone enveloping the intermediate major portion of the confined straight line reaction path and maintained in heat exchange relation with the latter, carbonaceous contaminants are burned from the catalyst particles descending through the annular contacting zone by an ascending oxygen-containing regenerating gas stream, resulting regenerated catalyst is discharged from the contacting zone downwardly through the particle feeding zone into the mixing zone and therein is aspirated by the upward feed of the hydrocarbonaceous fluid reactant stream to form the aforesaid dispersed suspension, and used regeneration gases are continuously discharged from the upper portion of the annular contacting zone while separately therefrom the vaporous reaction products are withdrawn from the upper portion of the separating zone.

The improved processing operation thus effects the conversion of the reactant stream during its flow through a single straight line path, while contacting and holding the catalyst particles in a relatively dilute phase concentration, or dispersed suspension of particles, and the retention of a large mass of solid particles in a fluidized dense phase bed is eliminated in effecting the conversion of the reactant in the upflow reaction path into the desired reaction products. The reaction path is provided of sufficient length to effect sufficient conversion of the reactant stream to permit the ultimate withdrawal of a desired product stream. It is within the scope of the contemplated operation, however, to recycle a portion of the product stream with the fresh reactant stream, to in turn permit an operation with a relatively low conversion per pass through the reaction zone wherever such low conversion per pass favors ultimate maximum desired conversion.

In order to attain objects and advantages aimed at by this invention the straight line reaction path is confined by a vertical tubular element having vertically coaxial end portions so that the fluid reactant can be introduced in a straight upward flow to the bottom end of the tubular element and the suspension of solid particles in fluid reaction products can be discharged vertically upward from this tubular element. The vertically coaxial arrangement of the inlet and discharge openings of the tubular element assures substantially uniform aspiration of solid particles by the reactant feed stream at the periphery of the bottom or inlet end to the straight line reaction path and a discharge of the dispersed suspension substantially uniform over the cross-sectional area of the straight line reaction path. Thereby an extreme uniformity of treatment is experienced by the fluid reactant and flow resistance, erosion, and particle disintegration are all reduced to an absolute minimum.

Preferably, an enlarged settling and separating zone is maintained at the top of the reaction path in order to permit the accumulation of the contacted particles for subsequent transfer to the annular contacting or regeneration zone, and in addition, to aid in the stripping and disengaging of reaction products from the contacted particles.

A preferred compact arrangement of the contacting zones positions the straight line or upflow reaction path vertically within a confined conduit suspended concentrically within the annular contacting or regenerating zone or chamber. Thus, the contacted particles from the upper separating zone, receiving the reaction product stream and the contacted particles, pass downwardly to and through the annular contacting zone which is below the separating zone and surrounds the reaction path along an intermediate and preferably major portion of the latter, permitting a continuous descending flow of particles countercurrently to a second fluid reactant or reactivating stream which is introduced into the lower portion of the annular contacting zone. In a catalytic process wherein endothermic conversion of a hydrocarbonaceous reactant is effected in the straight line reaction path and catalyst particles therein are contaminated with a carbonaceous deposit, a reactivating gas stream, containing free oxygen, effects a burning and subsequent removal of the carbon deposit in an exothermic operation in the annular contacting zone. The enclosed upflow reaction zone thus readily obtains heat by indirect heat exchange, as well as by the heat content of the catalyst particles as they are introduced into the lower portion of the reaction zone.

In a preferred operation, the particles from the annular contacting zone are withdrawn in a relatively dense compact column through an elongated stripping zone which communicates with the lower end of the upflow reaction path. A separate mixing zone may be provided immediately below the inlet end of the upflow reaction zone and in direct, open communication therewith, to effect the mixing of reactant stream with subdivided particles prior to a disperse phase transfer through the reaction zone. However, in a preferred operation, a fluid reactant stream is directed upwardly into the lower end of the vertical reaction path by means of a suitable inlet conduit, so that the reactant stream being discharged into the lower end of the reaction zone provides for the aspiration of the subdivided particles from the lower portion of a stripping zone into the upflow reaction zone in a manner to become admixed with the reactant stream and form a dilute phase or dispersed suspension of particles in the resulting vaporous reactant stream. This method of aspirating the particles provides a controlled means of introducing particles into the upflow reaction zone, as well as means for effecting an efficient mixing between the reactant stream and particles, prior to the passing of the mixture in a continuous dilute phase upwardly through the elongated confined reaction path.

In a preferred apparatus arrangement, there is provided a compact unitary structure, comprising in combination, a vertically disposed external contacting chamber, with a particle settling and separating section in the upper portion thereof, an elongated particle withdrawing well projecting downwardly from the bottom portion of the external contacting chamber, a vertical straight line conduit extending from the withdrawal well upwardly through the external contacting chamber into a separate settling and separating chamber which is supported on and directly above the separating section of the external chamber, conduit means providing a particle passageway between the upper separating chamber and the separating and settling section of said external chamber, an inlet at the lower portion of the contacting chamber for the supply of fluid thereto, a separate inlet extending upwardly into the particle withdrawal well and into the vertical conduit for the introduction of a fluid reactant stream and the aspiration of solid particles from the particle withdrawal well into the vertical conduit, and separate fluid outlets from both the particle separating section of the external chamber and from the elevated settling and separating chamber at the top of the vertical conduit.

Preferably, the vertical conduit extending upwardly through the withdrawal well and the external contacting chamber is supported from the latter in a manner permitting the conduit to freely expand under heating conditions and not require the use of an expansion joint. In other words, a single point or level of supporting the conduit within the interior of the contacting chamber utilizes, in combination with suitable guides, means for maintaining the conduit in its desired position.

Various means may be provided for passing the accumulation of contacted particles from the upper separating and settling chamber to the upper portion of the external contacting chamber in a continuous downward flow. For example, a conduit with valve control means may be utilized to transfer the particles downwardly, or alternatively, a concentric cylindrical or baffle arrangement may be utilized to pass the particles downwardly in a reversing or U tube type of flow and the rate of flow controlled by the introduction of stripping and aerating gas being introduced into the lower portions of the U path.

A preferable form of the apparatus for effecting a dilute phase contacting operation in accordance with the present invention, comprises in combination, a vertically disposed and elongated external contacting chamber having an elevated enlarged diameter settling and separating section superimposed thereon and in open communication with the elongated portion, a lower particle withdrawal well connecting with and communicating with the lower portion of the external elongated contacting chamber, a vertical straight conduit extending from the lower portion of said particle withdrawal well upwardly through said elongated chamber into an elevated settling and separating chamber disposed above and in vertical alignment with the enlarged upper section of said elongated external contacting chamber, with passageway means from the elevated separating chamber into the settling and separating section directly therebelow and communicating with the upper portion of the elongated external chamber, an inlet to the lower portion of said external contacting chamber, a separate fluid inlet extending through the lower portion of said withdrawal well and upwardly into the lower portion of said vertical conduit, the latter inlet being suitable for effecting the introduction of a fluid stream into the lower end of the vertical conduit and the aspiration of solid particles from the particle withdrawal well into said vertical conduit and into admixture with the fluid stream being introduced thereto, and separate fluid outlets from both the particle separating section and the particle separating chamber at the top of the unitary apparatus.

It is a particular feature of this embodiment to maintain a tubular external chamber suitable for the regeneration of catalyst particles in a catalytic conversion operation, which encompasses the vertical conduit used for the reaction section of the unit for at least a major portion of the vertical height of the vertically disposed straight conduit, and in turn effect an efficient transfer of heat from the regenerating zone into the endothermic conversion zone. A modified embodiment of the apparatus also preferably makes use of the aforementioned means of supporting the internal vertical conduit from a single point or level of support, and, guide means which permit the conduit to expand as may be necessary for differential temperature conditions. Means for stripping the catalyst particles withdrawn from the accumulation in the upper settling and separating zone, and from the lower portion of the regenerating zone, is provided by the connection of conduits to each particle transfer or passageway zone for the introduction of a suitable inert stripping gas uniformly into downwardly moving columns of particles.

It is a particular advantage and feature of the present invention to provide a simple cyclic flow of the solid particles through the contacting zones, as permitted by the present single upward flow, wherein the conversion of the reactant stream takes place, and a single downward gravity flow of particles through a regeneration zone, to subsequently reach the lower inlet end or mixing end of the reaction zone. The relatively small diameter tubular contacting zones permit a much smaller inventory of catalyst in the system, than is required by the conventional type of conversion unit maintaining large diameter zones for a dense phase fluidized operation. The inside vertical conduit is normally used to confine the reaction or conversion zone, since, for example in the catalytic cracking of a hydrocarbon stream, sufficient conversion can be obtained as the vaporous reactant stream disperses and carries with it the suspended catalyst particles in a relatively dilute or dispersed phase transfer. The maintenance of a countercurrent flow in the regenerator permits a relatively dense phase contacting operation, with the reactivating gas moving upwardly countercurrently to the particle stream descending as an elongated moving or fluidized bed of small cross-sectional area. The dense phase countercurrent operation for the regeneration zone is preferable in that normally a longer period of contact is required to effect the substantially complete removal of carbonaceous deposit from the catalyst particles, as compared with the contacting of the particles in the conversion zone.

Reference to the accompanying drawing and following description thereof will serve to more clearly point out the operation and the processing flow, as well as the construction and arrangement of zones to provide a compact unitary apparatus for the entire cyclic flow of the solid material.

Figure 1 of the drawing is an elevational view, partially in section, providing a tubular reaction zone positioned internally within an enlarged regeneration zone.

Figure 2 of the drawing is an elevational view, partially in section, of a modified form of contacting apparatus, having a tubular conversion zone internally within an elongated and tubular type of regeneration zone, whereby there is a maximum degree of heat exchange relationship between the concentric contacting zones.

Referring now to Figure 1 of the drawing, it will be assumed that the unit and the improved processing flow is utilized in connection with a catalytic conversion operation of a vaporizable hydrocarbonaceous fluid reactant stream, such as a hydrocarbon or petroleum gas-oil being catalytically cracked into more desirable light fractions, The external chamber 1 of this embodiment is provided with a relatively large cross-sectional area suitable to effect the regeneration of a catalyst in a substantially dense phase operation, with subdivided catalyst particles being introduced into the upper portion thereof from an elevated separating chamber 2. A reactivating or regenerating gas, containing free oxygen, is introduced by way of line 3 and valve 4 into the lower end of the regenerator 1 and passes upwardly through the interior of the regenerating chamber countercurrently to descending particles. A grid or perforated plate 5 is positioned at the lower end of the regenerating chamber 1 in order to uniformly distribute the reactivating gas across the entire area of the regenerating chamber and effect a substantially uniform contacting of the descending particles. Resulting flue gases are discharged from the upper portion of the regenerating chamber 1 by way of an outlet 6 and a particle separator 7. The particle separator is indicated as being of a centrifugal type suitable for returning entrained particles by way of a dip leg 8 and valve 9 to the upper portion of the regenerator, while the flue gas, substantially cleaned of particles, is passed outwardly by way of the line 10 and control valve 11. The hot flue gases may be utilized in heat exchange apparatus, not shown, to generate steam, or alternatively, to effect the heating of a reactant stream, or the like.

The reactivated catalyst particles are continuously withdrawn from the lower portion of the regenerating chamber 1 by way of a smaller diameter or cross-sectional area particle withdrawal well and stripping zone 12, which in the present embodiment, depends vertically from the lower portion of the regenerator providing an annular-shaped stripping zone having spaced perforated plates 13 to uniformly effect the countercurrent flow between a stripping gas and the descending particles. Preferably the withdrawn particles pass downwardly in a relatively compact column being aerated sufficiently by the gasiform stripping medium to permit free flow and movement. The medium is introduced to the stripping and particle withdrawal well 12 by way of lines 14 and 15, having respectively, control valves 16 and 17. The stripping medium is also preferably introduced uniformly into the stripping zone by way of distributing headers 18 and 19.

The stripped and regenerated catalyst particles from the lower portion of the withdrawal well 12 are continuously passed by eduction or aspiration into the lower end of a vertically disposed conduit 20, which as indicated, is an open-ended conduit extending from the lower portion of the withdrawal well 12 upwardly to the interior of the separating chamber 2. The fluid stream to be converted in the apparatus is charged to the lower end of the vertical conduit 20 by means of inlet line 21 and control valve 22, with the inlet line 21 extending upwardly into the lower end of the vertical conduit in a manner to effect the aspirating of particles from the lower portion of the withdrawal well 12 and effecting the mixing and suspending of particles in the vaporous stream being continuously introduced thereto. A moving baffle or valving means 23 is placed at the lower end of the vertical conduit 20 in order to regulate the space between the lower end of the conduit 20 and the lower end of the withdrawal well 12 and in turn control the flow of particles into the conduit 20 and into admixture with the fluid reactant stream.

In accordance with the present operation, the fluid reactant stream carries the catalyst particles upwardly in a dilute phase or dispersed suspension of particles, and in a straight line upward flow to the upper portion of the separating chamber 2. The vertical conduit 20 is made of such length as to permit sufficient contact time between the reactant stream and catalyst particles for effecting a conversion to desired reaction products.

The separating chamber 2 is preferably constructed of a relatively large diameter in order that the disperse phase may undergo further separating or settling of particles, by virtue of the product stream and catalyst particles being discharged into a reduced velocity zone. The reaction products stream with a small amount of entrained material passes by way of particle separator 24 and outlet line 25, with control valve 26 to suitable fractionating or recovering apparatus, not shown. Removed and recovered catalyst particles are discharged from the lower end of the separator 24 by way of dip leg 27 to the accumulation of particles in the lower portion of separating chamber 2. In the present embodiment, the accumulated particles are continuously passed downwardly in an annular shaped column surrounding the vertical conduit 20 and within a partitioning and a cylindrically shaped baffle 28 into an upturned cup-shaped baffle 29. The latter baffle connects with the conduit 20 at a point below the end of baffle 28 and in turn circumscribes the baffle 28, in order to provide a U shaped passageway, or gas sealing arrangement, for the continuous transfer of the accumulated particles into the upper portion of the regenerator chamber 1. A stripping gas is introduced into the lower portion of the transfer well by means of conduit 30 and control valve 31, in order to effect the stripping of contacted catalyst particles prior to their introduction into the regenerating zone. Steam or other suitable inert gas is preferably used for the stripping of the catalyst particles. Also, a suitable gaseous or vaporous aerating medium is introduced into the outer leg of the U shaped passageway by way of line 32 and control valve 33 in order to effect the control of the transfer of particles from one zone to another. The uniform distribution of the aerating gas from conduit 32 is effected by means of a header 34 connecting with the outer baffle 29, and preferably discharges upwardly through the outer annular zone between baffles 28 and 29, such that a controlled aeration or aspiration of the particles may be maintained.

The transfer of contacted catalyst particles from the upper separating chamber 2 into the upper portion of the regenerator 1, may of course be effected through a suitable conduit and control valve, or other conventional types of passageway means, however, the use of the U-shaped trap or passageway as shown in the drawing, is of advantage in effecting a regulated flow of particles from one one to another in a manner which eliminates a mechanical valve or other mechanical flow control device.

The enlarged cross-sectional area regenerator 1, as indicated in Figure 1, permits the maintaining of a relatively dense phase fluidized bed within the lower portion of the chamber, although, a continuous downward gravity flow or "raining" of the catalyst particles, in accordance with the present improved operation, may be maintained in a relatively light or disperse phase operation, with little or no dense phase bed being maintained directly within the regenerating zone. The latter type of operation may be aided by providing a particle distributing grid 5 in an elevated portion of the chamber 1 in proximity of or slightly below the baffle 29 so as to assure uniform distribution of the descending particles over the cross-sectional area of the chamber 1. The reactivated particles reaches the lower end of the regenerator chamber and entering the particle withdrawal well 12 are, however, maintained in the withdrawal well and stripping zone in a relatively compact aerated column. The compact or relatively dense phase column of particles assures the maintenance of a descending stream available for aspiration into the lower end of the conversion conduit 20 by means of the reactant stream entering conduit 21.

Also, in accordance with the aforementioned preferred construction and arrangement of the unitary apparatus, the vertical conduit 20 is supported from a single point, in this case, from the lower end of the regenerating chamber 1 by means of suitable supporting ribs 35, which in turn rest on the upper extremity of the wall of the withdrawal well 12. Guiding ribs 36 are spaced around the circumference of the conduit 20 and within the cylindrical partitioning and baffle member 28. Thus, the vertical conduit 20 is free to expand downwardly within the lower well 12 and upwardly through the regenerating zone and to the upper separating chamber without the necessity of utilizing a special expansion joint, or the like, for accommodating differential expansions between the inner and outer portions of the apparatus.

For purposes of assembly of the unitary apparatus, the upper chamber 2 is indicated as being separate from but supported on the lower regenerating chamber 1 while the particle withdrawal well 12 is indicated as being attached to or supported from the lower end of the regenerating chamber 1. A removable upper head 37 is also provided on the upper separating chamber 2, in order that the vertical conduit 20 may be placed concentrically within the chambers, as well as providing means for access to the upper chamber for inspection or repair purposes.

Referring now to Figure 2 of the drawing, there is shown a modified construction and arrangement of the contacting zones with a tubular regeneration chamber 40 positioned externally around an inner tube or conduit 41 providing an elongated tubular reaction zone, which as provided by the present invention permits the conversion to take place in an upwardly moving dispersed phase of reactant stream and catalyst particles. The fluid reactant stream is charged to the unit by way of conduit 42 and control valve 43 such that the reactant stream is sprayed or discharged directly upwardly into the lower end of the vertical conduit 41. Regenerated catalyst particles pass downwardly from the lower end of the outer tubular chamber 40 into a stripping chamber 44, which in addition to providing a zone for stripping the catalyst particles of adsorbed or entrained combustion products, effects the accumulation of the reactivated particles to a relatively dense phase aerated mass available for introduction to and aspiration into the lower end of the conversion zone as provided by conduit 41.

A reactivating fluid, which in the case of carbonized catalysts, contains air or free oxygen, is supplied to the lower end of the regenerating zone within the tubular chamber 40 by way of line 45, control valve 46, and a suitable distributing head 47. The regenerating fluid is introduced upwardly through the external chamber 40 at a velocity maintaining the aeration of the catalyst particles, but permitting the continuous downward movement of particles countercurrently to the upward flow of the gas stream. Similarly, a stripping fluid is introduced to the lower end of the stripping chamber 44 by way of line 48, valve 49, and header 50, providing for the uniform distribution of the stripping medium throughout the descending column of particles, without preventing the continuous downward movement of particles to the inlet or lower end of the vertical conduit 41. As described in connection with Figure 1 of the drawing, a suitable movable sleeve or valve arrangement 51 may be provided at the lower end of the conduit 41 to regulate the flow of particles into the lower end of the latter for admixture with the reactant stream entering by way of conduit 42.

In accordance with the present invention the dilute phase stream of reactant and catalyst particles passes vertically upwardly through conduit 41 and is discharged continuously into an upper separating chamber 52, which is of a substantially larger cross-sectional area than the conduit 41 in order to permit the settlement of particles from the gaseous stream and the accumulation of particles in the lower portion of the chamber, for subsequent transfer to the regenerating zone. The product stream, resulting from the contact with the catalyst particles, passes with a small amount of entrained particles into a separator 53 and from the latter by way of conduit 54 and valve 55 to suitable fractionating or recovery equipment. Particles which are recovered from the product stream are passed by way of dip leg 56 to the accumulation of catalyst particles in the lower portion of chamber 52.

Also, as described above in connection with the embodiment of Figure 1, a U trap type of passageway is provided for the transfer of accumulated particles from the separator 52 into a separating section 57, which in turn communicates with the upper portion of the tubular regenerating chamber 40. A partitioning baffle 58 curves downwardly and terminates in a lower cylindrical portion which in turn is encompassed by a cylindrically shaped and upturned baffle 59, with each baffle being concentrically spaced away from the inner vertical conduit 41 to provide a continuous U-shaped passageway for the transfer of the particles downwardly from the upper separator 52. Stripping fluid is introduced into the lower portion of the U-shaped passageway by means of conduit 60 and valve 61 in order to insure the stripping and removal of adsorbed gases or product vapors from the reaction zone and from the separator 52, while a suitable aerating fluid is passed by way of conduit 62 and valve 63 to a distributing header 64 which in turn connects with the upper leg of the U-shaped passageway through baffle 59. The aerating fluid being discharged through the header 64 is preferably directed upwardly in a manner so as to aspirate and aid in controlling the flow of particles through the transfer well. The transferred particles are permitted to descend from the lower portion of the upper separating section 57 downwardly through the annular shaped regenerating zone, maintained between the outer wall of the conduit 41 and the inner wall of the tubular chamber 40, effecting a countercurrent flow with respect to the regenerating fluid being introduced in the lower end of the chamber 40 through conduit 45. Resulting flue and combustion gases which reach the upper separating section 57 pass outwardly therefrom by way of outlet conduit 65 and the centrifugal particle separator 66. Recovered catalyst particles are returned from the lower end of the separator 66 by way of line 67 and control valve 68, while the flue gas stream leaves the upper portion of the separator by way of line 69 and control valve 70. As hereinbefore indicated, the hot regeneration gases may be used to advantage for the generation of steam or other heat exchange purposes.

The embodiment of Figure 2 of the drawing, not only provides for a dense phase operation within the annular contacting or regeneration zone, wherein the particles descend in a gravity flow countercurrently to an upwardly flowing reactant or reactivating fluid stream and resulting gasiform products, but in addition, maintains an elongated zone that is in heat exchange relationship with the vertical conduit 41, which in turn defines the upflow reaction zone for the upwardly moving disperse stream of the fluid reactant and catalyst particles. In the catalytic conversion of a hydrocarbon stream, the exothermic oxidation of carbon within the regeneration zone provides a considerable quantity of heat which may be utilized advantageously by heat exchange or heat transfer into the reaction zone within conduit 41.

In order to maintain the desired dense phase operation within the regeneration zone, the cross-sectional area of the latter is constructed such that the area is only about 50 to 75% of that of the cross-sectional area of the reaction zone within conduit 41. It may readily be seen that the present apparatus and method of conducting the conversion of the reactant stream in a disperse type of flow, permits the maintenance of a much smaller catalyst inventory than in the conventional unit using the large cross-sectional area chambers suitable for dense phase operation.

The present apparatus construction and arrangement is such that the internal vertical conduit 41 is supported by means of lugs or ribs 71 at the upper extremity of the tubular regenerating chamber 40, while guide fins or ribs 72 are attached to a lower portion of the inner conduit 41 in order to maintain the latter concentrically with the external chamber 40 and in alignment with the lower stripping chamber 44 and the upper separating chamber 52. The upper stripping chamber 52 and the regenerator separating section 57 are preferably of a relatively large diameter as compared with the tubular chambers, 40 and 41 respectfully, in order to permit the formation of a light catalyst phase and the settling of substantially all of the particles into the lower portion of each section, such that the catalyst load in each of the centrifugal type of separators is materially reduced. The compact arrangement also provides for the supporting of the upper separating chamber 52 directly above and on the separating section 57 such that the upper end of the internal conduit 41 need not be exposed to permit unnecessary loss of heat from the unitary apparatus.

The embodiments of both Figures 1 and 2 provide an annular shaped stripping section for regenerated particles which encompasses the inlet end of the internal conduit or tubular reaction zone, however, as hereinbefore noted, a separate mixing zone may be utilized and the annular shaped stripping zone replaced by a more conventional tubular or cylindrically shaped zone. Each of the embodiments shown and described do have the desired advantage of providing for the shortest travel of the catalyst particles in a continuous cyclic flow. In other words, a single upward flow of the catalyst through the inner conduit 20 or 41 and a single downward gravity flow of the particles through the separating zones and the regeneration zone provide for the most efficient transfer of particles and in turn an efficient simplified processing flow, with a minimum of external apparatus surface requiring heat insulation for conversion operations at elevated temperatures.

As apparent from the foregoing, the invention is directed more particularly to the conversion of hydrocarbon reactants into commercially more valuable products, including notably the production of high antiknock value gasoline by the catalytic cracking of higher boiling hydrocarbon oils, the catalytic dehydrogenation of normally gaseous and low boiling liquid hydrocarbons such as butane, butene, ethyl benzene and the like into unsaturated derivatives of the same number of carbon atoms per molecule, and the improvement of the motor fuel characteristics or aromaticity of naphtha fractions by catalytic reforming or hydroforming. In practicing these conversion operations, the cracking, dehydrogenation or reforming reaction is effected substantially entirely within the upflow or straight line reaction path at conversion conditions of temperature, time, pressure and catalyst which are now well known or understood per se in the art and therefore need not be specifically described herein. In these operations, the linear velocity of the gasiform fluid in the upflow reaction path generally is maintained at least at 15 feet per second and preferably within the range of from 25 to 65 feet per second. Desirable catalyst concentrations are readily maintained at these upflow velocities in the dispersed phase when utilizing catalyst, preferably of spheroidal shape, of less than 5 mm. diameter; particles of between 0.01 and 0.8 mm. diameter are preferred, and within this range the best average size for most purposes is 45 to 200 microns.

The reaction is essentially terminated with the discharge of the dispersed suspension from the upflow reaction path and, in the case of the aforementioned cracking, dehydrogenation reforming and hydroforming treatments and similar operations involving deposition of carbonaceous contaminants on the solid particles in the upflow reaction path, the particulated solid is regenerated in the contacting zone around the upflow reaction path. The termination of the reaction is brought about largely by the rapid particle separation resulting in the upper settling and separating zone from the drastically reduced linear velocity of flow of the conversion products therein, relative to the linear flow rate in the upflow reaction path. The termination of the reaction may be aided by diluting or by both diluting and cooling the reaction products in the separating zone with an inert medium, such as the sealing and stripping medium passing upwardly through the catalyst accumulation or sealing layer of particles in the lower portion of the upper settling and separating zone. In the performance of short time reactions at extremely high temperatures such as in the conversion of more saturated hydrocarbons with the aid of catalytic or more or less inert solid heat transfer particles principally into low molecular unsaturated hydrocarbons such as ethylene or acetylene, it is of advantage to provide for more effective quenching of the reaction products issuing from the upflow reaction path by the injection of a liquid cooling medium, such as water or a refractory hydrocarbon distillate fraction separable by condensation from the low molecular unsaturated reaction products, through a suitable distributing and spraying device (not shown in the drawings) into an elevated portion of the upper separating zone so as to cause its vaporization therein and thereby lower the temperature of the reaction products wherefrom the cooling medium is subsequently recovered by condensation or fractionation.

In the catalytic cracking of gas oils and similar hydrocarbon charging stocks to produce gasoline the present invention permits the performance of the cracking reaction at otherwise practically equal conditions of temperature, pressure, catalyst and gasoline yield in somewhat less than 65% of the reaction time normally afforded the reactant in the chamber type unit presently in commercial use for fluidized dense phase bed operation, and with a catalyst inventory amounting to less than 60% of that in the latter type of unit; the reaction product obtained by the present process tends to exhibit a more favorable product distribution in respect of the gasoline produced as well as of the more desirable components of the gaseous by-product.

Material advantages similar to those pointed out above are obtainable by the present invention in its application to various other conversion reactions. Thus, the invention may be applied to the thermal decomposition of normally gaseous hydrocarbons into a gaseous product having a high content of free hydrogen and/or highly unsaturated hydrocarbons at temperatures maintained in excess of 1800° F. and preferably at from 2100° to 2400° F. in the upflow reaction path with the aid of finely divided refractory solid heated in the annular contacting zone and then suspended in the normally gaseous hydrocarbon reactant in the manner generally described in the foregoing specification. In this mode of practicing the invention the thermal efficiency of the operation is readily maintained at an unusually high level by virtue of the dual heat transfer to the reactant by direct contact with freshly heated solid particles and indirect heat exchange from the annular contacting zone through the wall of the vertical tubular reaction zone to the dispersed suspension ascending therein. Normally the carbonaceous material depositing on the solid particles during this conversion reaction in the upflow reaction path is sufficient by its combustion in the annular contacting zone to furnish the entire processing heat; however, additional fuel may be supplied to the annular contacting zone to supplement therein the heat generation by combustion to the extent necessary for performance of the conversion reaction in the upflow reaction path whenever the deposition of combustible material on the solid particles in the latter is inadequate for that purpose.

The process and apparatus of the invention may be applied moreover to the partial oxidation of hydrocarbons in the vapour phase with the aid of particles of a solid contact material acting as heat transfer agent and at the same time fostering the controlled oxidation of the hydrocarbon reactant. Thus methane may be converted to formaldehyde or to water gas in contact with a reducible metal oxide (such as for example cupric oxide, vanadium oxide, chromium trioxide, nickel sesquioxide and the like)

which during the conversion reaction undergoes reduction by donating oxygen for the controlled oxidation and is subsequently reoxidized in the annular contacting or regenerating zone. If so desired, regulated amounts of free oxygen may be introduced together with the hydrocarbon reactant into the upflow reaction path to supplement the oxygen donated by the solid material. In either case, the hydrocarbon reaction temperature is controlled at the desired level within the range of 900° F.–1800° F., depending primarily on the desired reaction product, by the control of the regeneration in the annular contacting zone at a moderately higher temperature with the aid of an oxidizing gas of lower free oxygen content than air, for example by the recirculation of a stream of the hot flue gases removed from the upper portion of the annular contacting zone to the lower portion thereof in admixture with controlled proportions of air.

In another application of this invention to the selective oxidation of vaporizable organic materials, aromatic hydrocarbons such as naphthalene or orthoxylene may be converted to phthalic anhydride and maleic anhydride with the aid of an oxidizing gas and a suitable oxidation catalyst such as vanadium oxide at temperatures of from 900° to 1100° F. and approximately atmospheric or moderate superatmospheric pressure and contact times of 0.25–0.8 seconds with control of the reaction temperature by the cooling and recirculation of used regeneration gas in admixture with regulated amounts of air to the annular regenerating zone so as to maintain in the regeneration zone a slightly lower temperature than in the upflow reaction path and thereby absorb the excess heat of the exothermic oxidation reaction.

In a further, highly advantageous mode of applying the present invention, methane or natural gas is admixed with air and steam in a proportion which will yield a synthesis gas having a hydrogen to nitrogen ratio of 3:1 by volume, and this mixture is reacted in the upflow reaction path in the presence of a suitable particulated solid contact material, such as iron oxide, copper chromite, alumina, magnesia or zirconia, at a temperature of about 1600–1800° F. to yield said synthesis gas, which is suitable for subsequent further conversion into ammonia. The highly endothermic reaction involved in generating such synthesis gas in the upflow reaction zone is readily controlled by control of the supply of the endothermic reaction heat which is imparted directly to the circulating contact material in the annular contacting zone and indirectly to the ascending dispersed suspension in the reaction zone by the heat exchange through the wall of the vertical tubular reaction conduit, with combustion of carbon deposits from the contact material and additional fuel (to the extent that such fuel may be required) in the annular contacting zone.

Hydrogen cyanide may be produced in high yields by the present process by reacting ammonia with a low molecular hydrocarbon, such as propane or ethylene, in the upflow reaction path, confined by a non-ferrous tubular reactor, in the presence of a particulated aluminum oxide catalyst at temperatures of from about 1300 to 1600° F. and approximately atmospheric or low superatmospheric pressure, with the supply of the reactants in practically equimolecular proportion or with a slight molal excess of ammonia to the inlet of the upflow reaction path at a space velocity of from 100 to 600 volumes per catalyzing space volume per hour. Carbon is deposited during this reaction on the alumina catalyst particles and is burned therefrom in the annular contacting zone wherein the excess heat is dissipated preferably by cooling a stream of the combustion gases withdrawn from the upper portion of the annular contacting zone and recirculating the cooled flue gas stream in admixture with controlled amounts of air to the lower portion of the last-mentioned zone.

Although the invention has been described above largely with reference to the performance of reactions at high temperatures generally in the range of from 900° to 2400° F., it nevertheless is of similar utility and advantage for the performance of reactions at substantially lower temperatures. Thus, the synthesis of hydrocarbons by the well-known Fischer-Tropsch reaction from carbon monoxide-hydrogen mixtures at temperatures within the range of from 350° to 750° F. and pressures preferably between one and 100 atmospheres with the aid of an iron, nickel, cobalt or similar catalyst may be performed in accordance with the present invention in such manner that the synthesis reaction is effected in the upflow reaction path and the exothermic reaction heat is dissipated by contact of the separated catalyst particles in the annular contacting zone with a fluid cooling medium, such as for example steam or a hydrogen-containing gas, which latter may at the same time serve to remove contaminants from, and regenerate, the catalyst during countercurrent contact of the latter with the cooling fluid in the annular contacting zone.

The apparatus of the invention may be supplemented by suitable solids supply and withdrawal conduits to permit intermittent or continuous introduction of fresh solid material and withdrawal of contacted or treated solid particles. Thus, a solids supply conduit may be provided at the bottom portion of the stripping zone 12 of Figure 1 in proximity of the fluid supply conduit 21 thereof, or in an analogous manner at the bottom portion of the stripping zone 44 of Figure 2. Such solids supply conduit may also be used for evacuating of the solid particles content of the unit from time to time whenever it is desired to clean out the apparatus or completely replace the solid contact material during a shut-down period. A withdrawal conduit for removal of a controlled portion of the solid particles during operation of the unit is preferably provided at the lower end of chamber 1 of Figure 7 immediately above the distributing grid 5 thereof, and at the lower end of the separating zone portion of the annular contacting zone of Figure 2 in the proximity of the discharge end of the dip leg 67 thereof.

I claim as my invention:

1. An apparatus for contacting fluids with subdivided solid particles, which comprises in combination, a vertically disposed contacting chamber, a separating chamber superimposed and supported on said contacting chamber and separated from the latter by dividing means comprising a cup-shaped baffle in the upper portion of said contacting chamber and a partition having a depending conduit-like wall member projecting downwardly into and spaced from said cup-shaped baffle, a particle well projecting downwardly from the bottom portion of said contacting chamber, a vertical straight conduit communicating at its lower end with the lower portion of said particle well and extending upwardly through said contacting chamber and through said dividing means into said separating chamber to an elevation intermediate said partition and the top portion of said separating chamber so that the intermediate portion of said conduit within said contacting chamber is of greater length than the remaining upper open-ended conduit portion, said vertical conduit being supported from the contacting chamber at a single elevation and being circumferentially spaced from said depending wall member to form therewith an annular passageway for the transfer of solid particles from the bottom portion of said separating chamber into the upper portion of said contacting chamber, fluid inlet and outlet means at vertically spaced portions of said contacting chamber, a separate fluid inlet arranged at the lower portion of said particle well for directing solid particles from the latter with a fluid stream into the lower end of said vertical conduit, and fluid outlet means from said separating chamber.

2. An apparatus for contacting fluids with subdivided solid particles, which comprises in combination, a vertically disposed contacting chamber, a separating chamber superimposed and supported on said contacting chamber and separated from the latter by dividing means comprising a cup-shaped baffle in the upper portion of said contacting chamber and a partition having a depending substantially cylindrical conduit-like wall member projecting downwardly into and spaced from said cup-shaped baffle, an elongated particle well projecting downwardly from the bottom portion of said contacting chamber, a vertical straight conduit communicating at its lower end with the lower portion of said particle well and extending upwardly through said contacting chamber and centrally through said baffle and depending wall member to above said partition and terminating at a substantial distance below the top portion of said separating chamber so that the intermediate portion of said conduit within said contacting chamber is of greater length than the terminal open-ended conduit portion enveloped by said depending wall member and said separating chamber, said vertical conduit being supported from said contacting chamber at a single elevation and being circumferentially spaced from said depending wall member to form therewith an annular passagewy for the transfer of solid particles from the bottom portion of said separating chamber into the upper portion of said contacting chamber, fluid inlet and outlet means at vertically spaced portions of said contacting chamber, a separate fluid inlet arranged at the lower portion of said particle well for directing solid particles from the latter with a fluid stream into the lower end of said vertical conduit, and fluid outlet means at the upper portion of said separating chamber.

3. An apparatus for contacting fluids with subdivided solid particles, which comprises in combination, a vertically disposed contacting chamber having a lower elongated tubular-shaped contacting section and an upper particle section of appreciably greater cross-sectional area and lesser height than said contacting section, a separating chamber supported by and superimposed on said contacting chamber above said separating section and separated from the latter by dividing means comprising a cup-shaped baffle in the upper portion of said contacting chamber and a partition having a depending conduit-like wall member projecting downwardly into and spaced from said cup-shaped baffle, a particle well projecting downwardly from the bottom portion of said contacting chamber, a vertical straight conduit communicating at its lower end with said particle well and extending upwardly through said contacting chamber and centrally through said baffle and depending wall member to above said partition and terminating at a substantial distance below the top portion of said separating chamber so that the intermediate portion of said conduit enveloped by said contacting section is of greater length than the open-ended terminal conduit portion enveloped by said depending wall member and said separating chamber, said vertical conduit being supported from said contacting chamber at a single elevation and being circumferentially spaced from said depending wall member to form therewith an annular passageway for the transfer of solid particles from the bottom portion of said separating chamber into the upper portion of said contacting chamber, fluid inlet means to the lower portion of the contacting section of said contacting chamber, separate fluid outlet means at the upper portions of said separating chamber and the separating section of said contacting chamber, and a separate fluid inlet arranged at the lower portion of said particle well for directing solid particles therefrom with a fluid stream into the lower end of said vertical conduit.

4. An apparatus for contacting fluids with subdivided solid particles, which comprises in combination, a vertically disposed contacting chamber, a separating chamber superimposed and supported on said contacting chamber, a partition between said chambers having a depending conduit-like wall member projecting downwardly into the upper portion of said contacting chamber, an open-ended vertical conduit extending upwardly through said contacting chamber and said wall member into said separating chamber to an elevation above said partition and below the top of the separating chamber, said vertical conduit being spaced from said wall member and the latter being open at its lower end, a cup-shaped baffle having a closed bottom portion connected to said vertical conduit below the open lower end of said wall member, a cylindrical wall portion circumscribing and spaced from said wall member and an upper end in open communication with the interior of said contacting chamber, means for introducing fluid to the lower portion of said cup-shaped baffle, means for passing solid particles from the contacting chamber to the lower end of said vertical conduit, and means for introducing fluid upwardly into the lower end of said conduit.

5. The apparatus of claim 4 further characterized in that said vertical conduit is provided with ribs supporting the conduit from the contacting chamber at a single elevation and permitting longitudinal expansion of the conduit with respect to said chambers.

References Cited in the file of this patent

UNITED STATES PATENTS

| 2,412,152 | Huff | Dec. 3, 1946 |
| 2,459,824 | Leffer | Jan. 25, 1949 |
| 2,464,257 | Pelzer et al. | Mar. 15, 1949 |
| 2,506,307 | Martin | May 2, 1950 |
| 2,511,652 | Shand | June 13, 1950 |
| 2,589,124 | Packie | Mar. 11, 1952 |
| 2,606,097 | Goodson et al. | Aug. 5, 1952 |